US012700520B2

(12) United States Patent　　　　　(10) Patent No.:　US 12,700,520 B2

Welte　　　　　　　　　　　　　　　　(45) Date of Patent:　　Aug. 4, 2026

(54) SYSTEMS AND METHODS FOR BEAM SHAPING FOR LARGE ASPECT RATIO WITH A SINGLE CYLINDRICAL LENS

(71) Applicant: IonQ, Inc., College Park, MD (US)

(72) Inventor: Joachim Welte, Carrboro, NC (US)

(73) Assignee: IonQ, Inc., College Park, MD (US)

( * ) Notice: Subject to any disclaimer, the term of this patent is extended or adjusted under 35 U.S.C. 154(b) by 378 days.

(21) Appl. No.: 18/442,829

(22) Filed: Feb. 15, 2024

(65) Prior Publication Data

US 2024/0282475 A1　　Aug. 22, 2024

Related U.S. Application Data

(60) Provisional application No. 63/485,733, filed on Feb. 17, 2023.

(51) Int. Cl.
G21K 1/20　　　　(2026.01)
G06N 10/40　　　　(2022.01)
G21K 1/02　　　　(2006.01)

(52) U.S. Cl.
CPC ............... G21K 1/20 (2026.01); G06N 10/40 (2022.01); G21K 1/025 (2013.01)

(58) Field of Classification Search
CPC ........... G21K 1/20; G21K 1/025; G06N 10/40
See application file for complete search history.

(56) References Cited

U.S. PATENT DOCUMENTS

| | | | | |
|---|---|---|---|---|
| 10,649,307 B2 * | 5/2020 | Vernon | ................ | G02F 1/3556 |
| 10,871,699 B2 * | 12/2020 | Reddy | ................... | G02F 1/3544 |
| 11,593,699 B2 * | 2/2023 | Bradler | ................ | G06N 10/40 |
| 2016/0156466 A1 * | 6/2016 | Kirby | .................... | H04B 10/70 |
| | | | | 398/40 |

* cited by examiner

*Primary Examiner* — Sean Luck

(74) *Attorney, Agent, or Firm* — ARENTFOX SCHIFF LLP

(57) ABSTRACT

Aspects of the present disclosure relate generally to systems and methods for use in the implementation and/or operation of quantum information processing (QIP) systems, and more particularly, for beam shaping for large aspect ratios with a single cylindrical lens. In some aspects, a QIP system includes a laser source, a cylindrical lens, and an ion trap. The laser source produces a Gaussian laser beam. The cylindrical lens is aligned with at least a portion of the laser beam and shapes the laser beam into a beam having an anamorphic shape. The ion trap includes a plurality of trapped ions addressable by the beam. The cylindrical lens orients the beam relative to the ion trap such that a fast axis of the beam is aligned with an axis of the plurality of trapped ions, and a slow axis of the beam is traverse to the plurality of trapped ions.

20 Claims, 10 Drawing Sheets

SYSTEMS AND METHODS FOR BEAM SHAPING FOR LARGE ASPECT RATIO WITH A SINGLE CYLINDRICAL LENS

CROSS-REFERENCE TO RELATED APPLICATION

This application claims the benefit of U.S. Provisional Patent Application No. 63/485,733, filed Feb. 17, 2023, the entire contents of which are hereby incorporated by reference herein.

TECHNICAL FIELD

Aspects of the present disclosure relate generally to systems and methods for use in the implementation, operation, and/or use of quantum information processing (QIP) systems.

BACKGROUND

Trapped atoms are one of the leading implementations for quantum information processing or quantum computing. Atomic-based qubits may be used as quantum memories, as quantum gates in quantum computers and simulators, and may act as nodes for quantum communication networks. Qubits based on trapped atomic ions enjoy a rare combination of attributes. For example, qubits based on trapped atomic ions have very good coherence properties, may be prepared and measured with nearly 100% efficiency, and are readily entangled with each other by modulating their Coulomb interaction with suitable external control fields such as optical or microwave fields. These attributes make atomic-based qubits attractive for extended quantum operations such as quantum computations or quantum simulations.

It is therefore important to develop new techniques that improve the design, fabrication, implementation, control, and/or functionality of different QIP systems used as quantum computers or quantum simulators, and particularly for those QIP systems that handle operations based on atomic-based qubits.

SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

This disclosure describes various aspects of beam shaping systems that include a single cylindrical lens. Such beam shaping systems are configured to produce Gaussian beams having large aspect ratios.

In some aspects, a quantum information processing (QIP) system includes a laser source, a cylindrical lens, and an ion trap. The laser source is configured to produce a laser beam. The laser beam is a Gaussian laser beam. The cylindrical lens is aligned with at least a portion of the laser beam and configured to shape the laser beam into a shaped beam having an anamorphic shape. The ion trap includes a plurality of trapped ions addressable by the shaped beam. The cylindrical lens is configured to orient the shaped beam relative to the ion trap such that a fast axis of the shaped beam is aligned with an axis of the plurality of trapped ions and a slow axis of the shaped beam is traverse to the plurality of trapped ions. A ratio of the slow axis to the fast axis is at least 5:1.

In some aspects, a method for changing a shape of a laser beam used to address trapped ions of quantum information processing (QIP) system includes aligning a first cylindrical lens with the laser beam. The first cylindrical lens has a first radius of curvature and is configured to produce a first shaped beam having a first ratio of the fast axis to the slow axis. The method includes dis-aligning the first cylindrical lens with the laser beam. The method includes aligning a second cylindrical lens with the laser beam. The second cylindrical lens has a second radius of curvature different than the first radius of curvature and configured to produce a second shaped beam having a second ratio of the fast axis to the slow axis. The second ratio is different than the first ratio.

In some aspects, a quantum information processing (QIP) system includes a laser source, a cylindrical lens mounting bracket, and an ion trap. The laser source is configured to produce a Gaussian laser beam. The cylindrical lens mounting bracket includes a first cylindrical lens and a second cylindrical lens. The first cylindrical lens is configured to shape the Gaussian laser beam into a first shaped beam oriented relative to the ion trap such that a fast axis of the first shaped beam is aligned with an axis of the plurality of trapped ions and a slow axis of the first shaped beam is traverse to the plurality of trapped ions. The first cylindrical lens has a first radius of curvature in the direction of the slow axis. The second cylindrical lens is configured to shape the Gaussian laser beam into a second shaped beam oriented relative to the ion trap such that a fast axis of the second shaped beam is aligned with the axis of the plurality of trapped ions and a slow axis of the second shaped beam is traverse to the plurality of trapped ions. The second cylindrical lens has a second radius of curvature in the direction of the slow axis. The second radius of curvature is different than the first radius of curvature. The ion trap includes a plurality of trapped ions addressable by the shaped beam. The cylindrical lens mounting bracket is actuable relative to the Gaussian laser beam such that either the first cylindrical lens or the second cylindrical lens can be aligned with the Gaussian laser beam.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
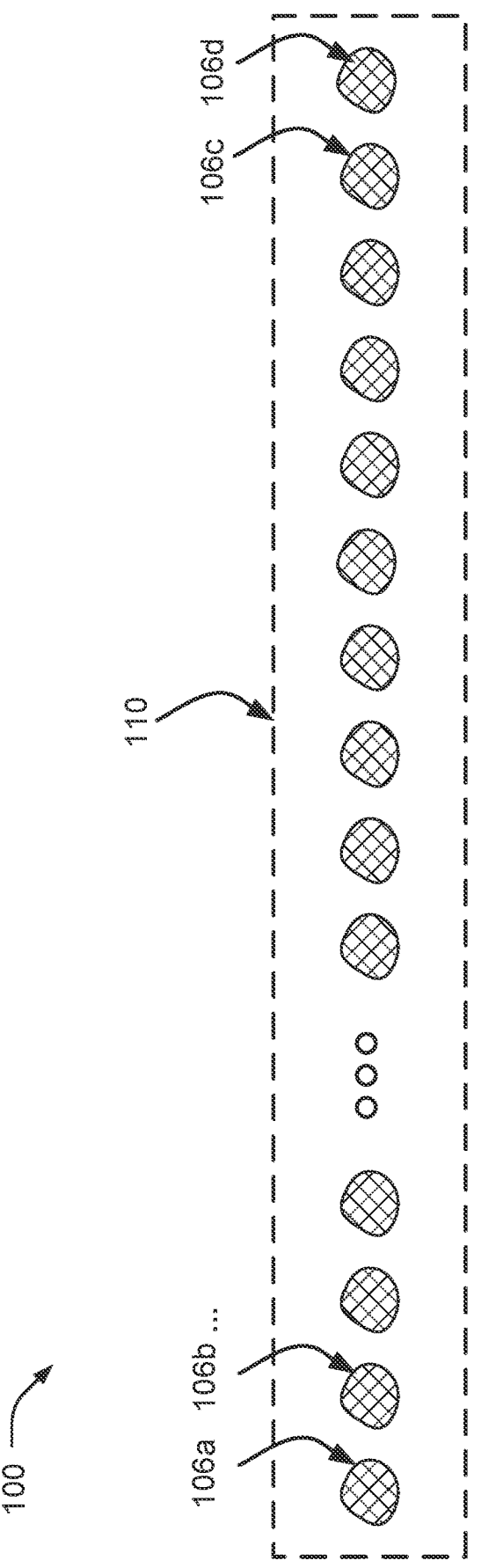
FIG. 1 illustrates a view of atomic ions of a linear crystal or chain in accordance with aspects of this disclosure.

The detailed description set forth below in connection with the appended drawings or figures is intended as a description of various configurations or implementations and is not intended to represent the only configurations or implementations in which the concepts described herein may be practiced. The detailed description includes specific details for the purpose of providing a thorough understanding of various concepts. However, it will be apparent to those skilled in the art that these concepts may be practiced without these specific details or with variations of these specific details. In some instances, well-known components are shown in block diagram form, while some blocks may be representative of one or more well known-components.

Quantum computing (QIP) systems conduct computer processing operations on chains of trapped ions. Such systems may include quantum gates that are controlled by Raman beams. Such gate control systems typically use laser beams having anamorphic profiles.

Conventional beam shaping devices that produce anamorphic beams use anamorphic beam prism pairs or a pair of cylindrical lenses. Although anamorphic prism pairs can in theory allow for arbitrarily preconfigured aspect ratios, the location of the waist of beams produced by such systems cannot be adjusted. This can lead to astigmatism between the high half-angle divergence and the low half-angle divergence axes of the laser beams. As used herein, the phrase "half angle divergence" refers to the derivative of the beam radius with respect to the axial position in the far field (e.g., at a distance from the beam waist which is much larger than the Rayleigh length). As used herein, the beam radius is defined based on the point with $1/e^2$ times the maximum intensity. A pair of cylindrical lenses may be arranged in a telescope configuration to produce anamorphic beams. However, such configurations are sensitive to misalignment between the cylindrical lenses, which can lead to diagonal astigmatism and/or beam rotation through the focus. Further, in order to produce anamorphic beams having large aspect ratios, the telescope configuration may be too long to be practical and/or may require lenses having very short focal lengths, which could introduce aberrations from surface form errors in the lens and/or alignment sensitivity to the system.

The beam paths used in QIP processes are typically long—with beam path lengths from about 0.5 meter (m) to about 5 m. Errors, for example due to flaws in the lenses, pointing issues, thermal changes ambient environmental conditions from cryogenic conditions, may be propagated along the length of the beam. Therefore, it is advantageous to reduce errors in the system and also configure optical systems to use as short beam path lengths as possible.

However, such systems are not suitable for producing anamorphic beams having large aspect ratios, for example aspect ratios greater than 5:1. In some aspects, example large aspect ratios are greater than 10:1. Throughout this disclosure, aspect ratios are provided in a format of the dimension of the axis having the low divergence beam in focused space to the dimension of the axis having the high divergence beam in focused space. Achieving anamorphic beams having aspect ratios greater than 5:1 is difficult in conventional systems because the required focal lengths would make the optical systems prohibitively long. For example, in such systems a lens having a focal length of about 20 millimeters (mm) may be required to achieve an aspect ratio above 5:1 (e.g., 10:1). Such lenses would have focal lengths of about 200 mm, which would greatly increase the beam path length in such systems. For a 4f-telescope the total path length is twice the sum of the focal lengths of the individual lenses, which would be around 440 mm in this example.

Solutions to the issues described above are explained in more detail in connection with FIGS. 1-10, with FIGS. 1-3 providing a background of QIP systems or quantum computers, and more specifically, of atomic-based QIP systems or quantum computers.

Figure 2:
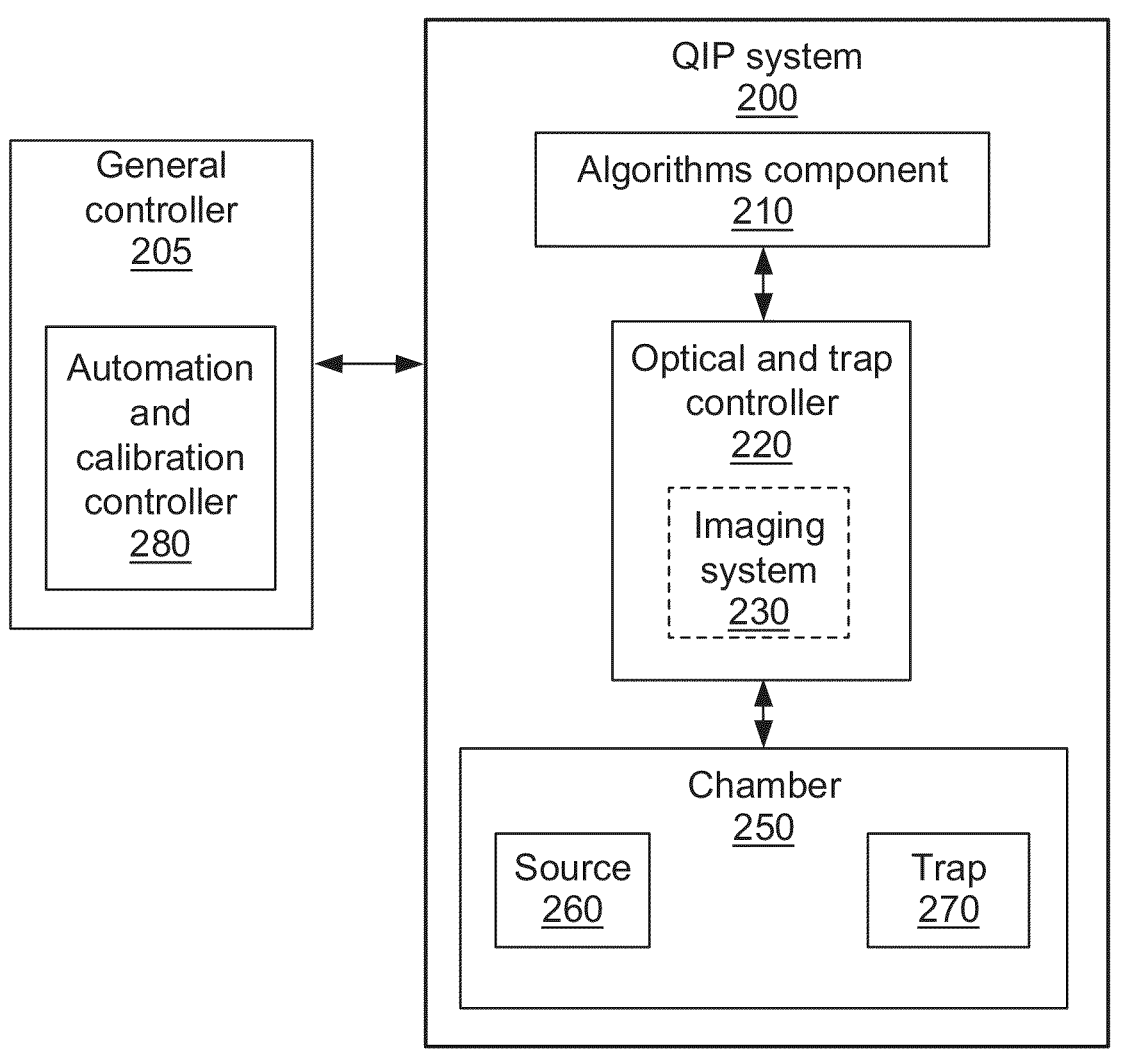
FIG. 2 illustrates an example of a quantum information processing (QIP) system in accordance with aspects of this disclosure.

FIG. 1 illustrates a diagram 100 with multiple atomic ions or ions 106 (e.g., ions 106a, 106b, . . . , 106c, and 106d) trapped in a linear crystal or chain 110 using a trap (not shown; the trap can be inside a vacuum chamber as shown in FIG. 2). The trap maybe referred to as an ion trap. The ion trap shown may be built or fabricated on a semiconductor substrate, a dielectric substrate, or a glass die or wafer (also referred to as a glass substrate). The ions 106 may be provided to the trap as atomic species for ionization and confinement into the chain 110. Some or all of the ions 106 may be configured to operate as qubits in a QIP system.

In the example shown in FIG. 1, the trap includes electrodes for trapping or confining multiple ions into the chain 110 laser-cooled to be nearly at rest. The number of ions trapped can be configurable and more or fewer ions may be trapped. The ions can be Ytterbium ions (e.g., $^{171}Yb^+$ ions), for example. The ions are illuminated with laser (optical) radiation tuned to a resonance in $^{171}Yb^+$ and the fluorescence of the ions is imaged onto a camera or some other type of detection device (e.g., photomultiplier tube or PMT). In this example, ions may be separated by a few microns ($\mu$m) from each other, although the separation may vary based on architectural configuration. The separation of the ions is determined by a balance between the external confinement force and Coulomb repulsion and does not need to be uniform. Moreover, in addition to Ytterbium ions, neutral atoms, Rydberg atoms, or other types of atomic-based qubit technologies may also be used. Moreover, ions of the same species, ions of different species, and/or different isotopes of ions may be used. The trap may be a linear RF Paul trap, but other types of confinement devices may also be used, including optical confinements. Thus, a confinement device may be based on different techniques and may hold ions, neutral atoms, or Rydberg atoms, for example, with an ion trap being one example of such a confinement device. The ion trap may be a surface trap, for example.

FIG. 2 illustrates a block diagram that shows an example of a QIP system 200. The QIP system 200 may also be referred to as a quantum computing system, a quantum computer, a computer device, a trapped ion system, or the like. The QIP system 200 may be part of a hybrid computing system in which the QIP system 200 is used to perform quantum computations and operations and the hybrid computing system also includes a classical computer to perform classical computations and operations. The quantum and classical computations and operations may interact in such a hybrid system.

Shown in FIG. 2 is a general controller 205 configured to perform various control operations of the QIP system 200. These control operations may be performed by an operator, may be automated, or a combination of both. Instructions for at least some of the control operations may be stored in memory (not shown) in the general controller 205 and may be updated over time through a communications interface (not shown). Although the general controller 205 is shown separate from the QIP system 200, the general controller 205 may be integrated with or be part of the QIP system 200. The general controller 205 may include an automation and calibration controller 280 configured to perform various calibration, testing, and automation operations associated with the QIP system 200. These calibration, testing, and automation operations may involve, for example, all or part of an algorithms component 210, all or part of an optical and trap controller 220 and/or all or part of a chamber 250.

The QIP system 200 may include the algorithms component 210 mentioned above, which may operate with other parts of the QIP system 200 to perform or implement quantum algorithms, quantum applications, or quantum operations. The algorithms component 210 may be used to perform or implement a stack or sequence of combinations of single qubit operations and/or multi-qubit operations (e.g., two-qubit operations) as well as extended quantum computations. The algorithms component 210 may also include software tools (e.g., compilers) that facilitate such performance or implementation. As such, the algorithms component 210 may provide, directly or indirectly, instructions to various components of the QIP system 200 (e.g., to the optical and trap controller 220) to enable the performance or implementation of the quantum algorithms, quantum applications, or quantum operations. The algorithms component 210 may receive information resulting from the performance or implementation of the quantum algorithms, quantum applications, or quantum operations and may process the information and/or transfer the information to another component of the QIP system 200 or to another device (e.g., an external device connected to the QIP system 200) for further processing.

The QIP system 200 may include the optical and trap controller 220 mentioned above, which controls various aspects of a trap 270 in the chamber 250, including the generation of signals to control the trap 270. The optical and trap controller 220 may also control the operation of lasers, optical systems, and optical components that are used to provide the optical beams that interact with the atoms or ions in the trap. Optical systems that include multiple components may be referred to as optical assemblies. The optical beams are used to set up the ions, to perform or implement quantum algorithms, quantum applications, or quantum operations with the ions, and to read results from the ions. Control of the operations of laser, optical systems, and optical components may include dynamically changing operational parameters and/or configurations, including controlling positioning using motorized mounts or holders. When used to confine or trap ions, the trap 270 may be referred to as an ion trap. The trap 270, however, may also be used to trap neutral atoms, Rydberg atoms, and other types of atomic-based qubits. The lasers, optical systems, and optical components can be at least partially located in the optical and trap controller 220, an imaging system 230, and/or in the chamber 250.

The QIP system 200 may include the imaging system 230. The imaging system 230 may include a high-resolution imager (e.g., CCD camera) or other type of detection device (e.g., PMT) for monitoring the ions while they are being provided to the trap 270 and/or after they have been provided to the trap 270 (e.g., to read results). In an aspect, the imaging system 230 can be implemented separate from the optical and trap controller 220, however, the use of fluorescence to detect, identify, and label ions using image processing algorithms may need to be coordinated with the optical and trap controller 220.

In addition to the components described above, the QIP system 200 can include a source 260 that provides atomic species (e.g., a plume or flux of neutral atoms) to the chamber 250 having the trap 270. When atomic ions are the basis of the quantum operations, that trap 270 confines the atomic species once ionized (e.g., photoionized). The trap 270 may be part of what may be referred to as a processor or processing portion of the QIP system 200. That is, the trap 270 may be considered at the core of the processing operations of the QIP system 200 since it holds the atomic-based qubits that are used to perform or implement the quantum operations or simulations. At least a portion of the source 260 may be implemented separate from the chamber 250.

It is to be understood that the various components of the QIP system 200 described in FIG. 2 are described at a high-level for ease of understanding. Such components may include one or more sub-components, the details of which may be provided below as needed to better understand certain aspects of this disclosure.

Aspects of this disclosure may be implemented at least partially using the lasers, optical components, and optical systems described above to address the ions of the ion trap 270.

Figure 3:
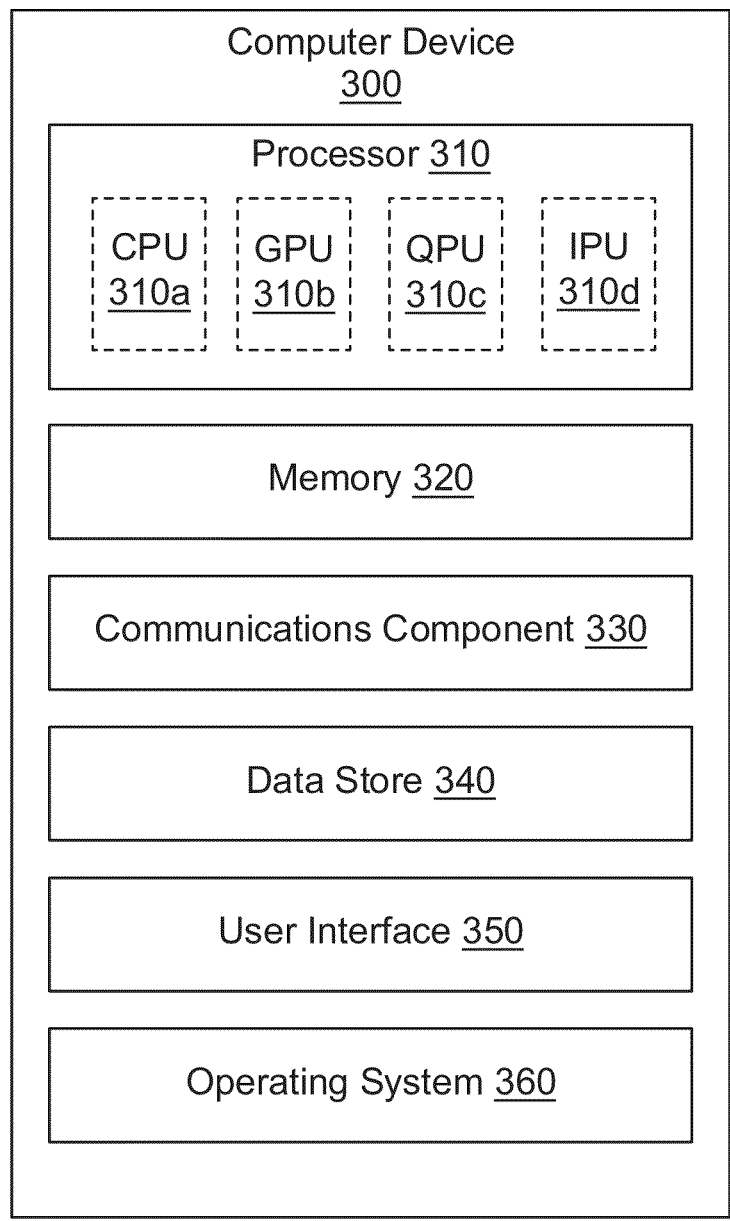
FIG. 3 illustrates an example of a computer device in accordance with aspects of this disclosure.

Referring now to FIG. 3, an example of a computer system or device 300 is shown. The computer device 300 may represent a single computing device, multiple computing devices, or a distributed computing system, for example. The computer device 300 may be configured as a quantum computer (e.g., a QIP system), a classical computer, or to perform a combination of quantum and classical computing functions, sometimes referred to as hybrid functions or operations. For example, the computer device 300 may be used to process information using quantum algorithms, classical computer data processing operations, or a combination of both. In some instances, results from one set of operations (e.g., quantum algorithms) are shared with another set of operations (e.g., classical computer data processing). A generic example of the computer device 300 implemented as a QIP system capable of performing quantum computations and simulations is, for example, the QIP system 200 shown in FIG. 2.

The computer device 300 may include a processor 310 for carrying out processing functions associated with one or more of the features described herein. The processor 310 may include a single processor, multiple set of processors, or one or more multi-core processors. Moreover, the processor 310 may be implemented as an integrated processing system and/or a distributed processing system. The processor 310 may include one or more central processing units (CPUs) 310a, one or more graphics processing units (GPUs) 310b, one or more quantum processing units (QPUs) 310c, one or more intelligence processing units (IPUs) 310*d* (e.g., artificial intelligence or AI processors), or a combination of some or all those types of processors. In one aspect, the processor 310 may refer to a general processor of the computer device 300, which may also include additional processors 310 to perform more specific functions (e.g., including functions to control the operation of the computer device 300). Quantum operations may be performed by the QPUs 310*c*. Some or all of the QPUs 310*c* may use atomic-based qubits, however, it is possible that different QPUs are based on different qubit technologies.

The computer device 300 may include a memory 320 for storing instructions executable by the processor 310 to carry out operations. The memory 320 may also store data for processing by the processor 310 and/or data resulting from processing by the processor 310. In an implementation, for example, the memory 320 may correspond to a computer-readable storage medium that stores code or instructions to perform one or more functions or operations. Just like the processor 310, the memory 320 may refer to a general memory of the computer device 300, which may also include additional memories 320 to store instructions and/or data for more specific functions.

It is to be understood that the processor 310 and the memory 320 may be used in connection with different operations including but not limited to computations, calculations, simulations, controls, calibrations, system management, and other operations of the computer device 300, including any methods or processes described herein.

Further, the computer device 300 may include a communications component 330 that provides for establishing and maintaining communications with one or more parties utilizing hardware, software, and services. The communications component 330 may also be used to carry communications between components on the computer device 300, as well as between the computer device 300 and external devices, such as devices located across a communications network and/or devices serially or locally connected to computer device 300. For example, the communications component 330 may include one or more buses, and may further include transmit chain components and receive chain components associated with a transmitter and receiver, respectively, operable for interfacing with external devices. The communications component 330 may be used to receive updated information for the operation or functionality of the computer device 300.

Additionally, the computer device 300 may include a data store 340, which can be any suitable combination of hardware and/or software, which provides for mass storage of information, databases, and programs employed in connection with the operation of the computer device 300 and/or any methods or processes described herein. For example, the data store 340 may be a data repository for operating system 360 (e.g., classical OS, or quantum OS, or both). In one implementation, the data store 340 may include the memory 320. In an implementation, the processor 310 may execute the operating system 360 and/or applications or programs, and the memory 320 or the data store 340 may store them.

The computer device 300 may also include a user interface component 350 configured to receive inputs from a user of the computer device 300 and further configured to generate outputs for presentation to the user or to provide to a different system (directly or indirectly). The user interface component 350 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, the user interface component 350 may include one or more output devices, including but not limited to a display, a speaker, a haptic feedback mechanism, a printer, any other mechanism capable of presenting an output to a user, or any combination thereof. In an implementation, the user interface component 350 may transmit and/or receive messages corresponding to the operation of the operating system 360. When the computer device 300 is implemented as part of a cloud-based infrastructure solution, the user interface component 350 may be used to allow a user of the cloud-based infrastructure solution to remotely interact with the computer device 300.

In connection with the systems described in FIGS. 1-3, the optical system described below includes a beam shaping lens configured to shape a Raman beam produced by a laser source into a anamorphic profile having an aspect ratio of at least 5:1 configured to address ions trapped in the ion trap 270. As used herein, the phrase "shaped beam" refers to the beam produced by the laser source after the beam has passed through the cylindrical lens.

As is described in greater detail below, in a focal plane the high half-angle portion of the shaped beam has a narrow cross-section in an axis oriented along the axis of the ion chain, which reduces the likelihood of addressing ions adjacent to a target ion when addressing the target ion. The low half-angle portion of the shaped beam has a wider cross-section in an axis oriented substantially transverse to the axis of the ion chain, which allows the shaped beam to clear the ion trap 270 close to a surface of the trap 270 and to clear a predetermined width of the ion trap 270, as required to target the desired ions in the trap. The width of the low half-angle portion of the shaped beam, however, should be narrow enough so that the shaped beam can pass through aperture(s) in the cryostat and/or trap housing(s) and/or travel past other components of the optical components of the QIP system 200 without being clipped.

Figure 4:
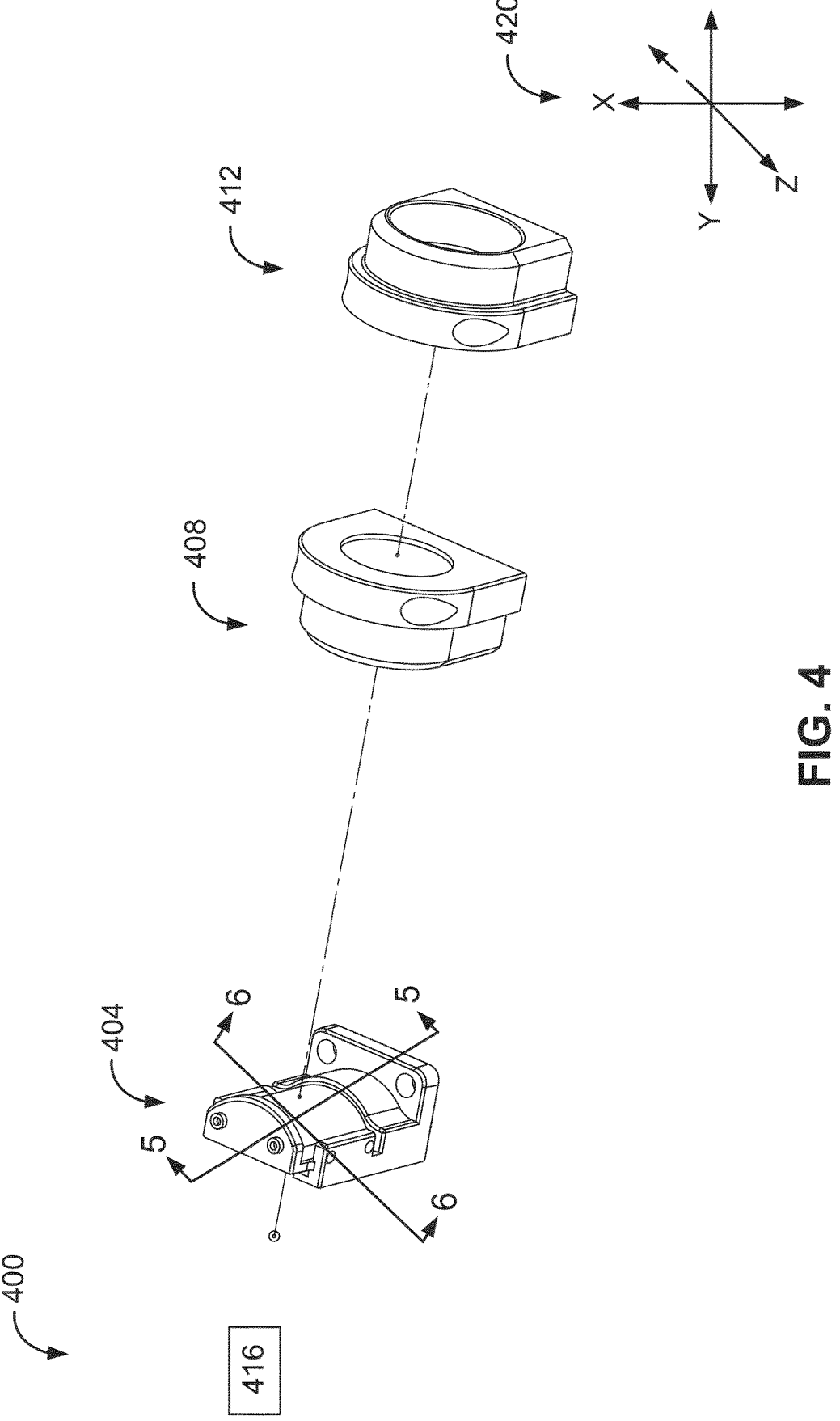
FIG. 4 illustrates an example optical relay that includes a cylindrical lens in accordance with aspects of this disclosure.

FIG. 4 illustrates an example optical relay 400 that includes a cylindrical lens 404, a first lens pair 408, and an optional second lens pair 412. The first lens pair 408 and the second lens pair 412 may be configured to adjust the magnification of the shaped beam 414 (FIGS. 5-6), the focus of the shaped beam, the positioning of the shaped beam, and so forth. For example, the first and second lens pairs 408, 412 may form a 4f-telescope configured for beam magnification. In some aspects, singlet lenses may be used instead of the beam pairs 408, 412. As shown, the optical relay 400 is aligned (e.g., in the Z-axis) with a laser source 416 configured to produce a laser beam, for example, a Gaussian beam. The laser source 416 is positioned outside of the cryostat containing the ion trap 270. In aspects in which the QIP system 200 does not include the cryostat, the laser source 416 is positioned outside of the vacuum chamber housing. The cylindrical lens 404 is positioned in a divergent path of the laser beam. The first and second lens pairs 408, 412 are configured to further process the beam shaped by the cylindrical lens 404. In some aspects, one or more optical components and/or relays may be positioned between the laser source 416 and the optical relay 400 and/or positioned between the optical relay 400 and the ion trap 270.

The laser beam is oriented such that the fast axis of the beam extends along the ion chain. According to the present disclosure, the term "fast axis" can be considered the axis for the laser beam with a higher divergence of the beam half-angle. The fast axis has a larger half-angle in focused space, which means that it produces a narrow beam. It is advantageous to produce a shaped beam that is in focus narrow in a direction of an axis of the ion chain to reduce a likelihood that the shaped beam 414 will excite adjacent trapped ions when addressing a target trapped ion (e.g., optical crosstalk). The shaped beam 414 is oriented such that a slow axis of the shaped beam 414 is substantially perpendicular to the axis of the ion chain. According to the present disclosure, the term "slow axis" can be considered the axis for the laser beam with a slower divergence of the beam angle. The slow axis of the shaped beam has a lower half-angle in focused space, which produces a wider beam in focus. It is advantageous to have a shaped beam 414 that is wider in a direction substantially perpendicular to the ion chain so that the shaped beam clears the ion trap 270 near a surface of the ion trap 270 and contacts a sufficient amount of a width of the ion trap 270. Further, the smaller half-angle along the non-ion chain axis may prevent clipping on the ion trap 270, which may reduce charging effects, maintain a good beam profile in focus, and reduce stray light. Further, the smaller half-angle creates a larger beam in focus, which make the system more tolerant to misalignment, vibrations, jitter, and ion motion.

In the example aspect, the cylindrical lens 404 can be a single (e.g., non-paired) cylindrical lens. Cylindrical lenses have curvature along one axis, such as the X-axis direction and the Y-axis direction of the coordinate system 420, and do not have curvature along other directions. It should be appreciated that the X, Y, Z coordinate system as shown in FIG. 4 is relative and provided to illustrate the orientation of the components of the system 400. Therefore, the cylindrical lens 404 is configured to shape the beam in a first direction (e.g., along a first axis), but leave the beam unshaped along another axis (e.g., a second or third axis orthogonal to the first axis). In the example optical relay 400, this configuration is advantageous because the cylindrical lens 404 can be used to change the shape of the low half-angle axis of the beam while leaving the shape high half-angle axis of the beam unchanged.

Figure 5:
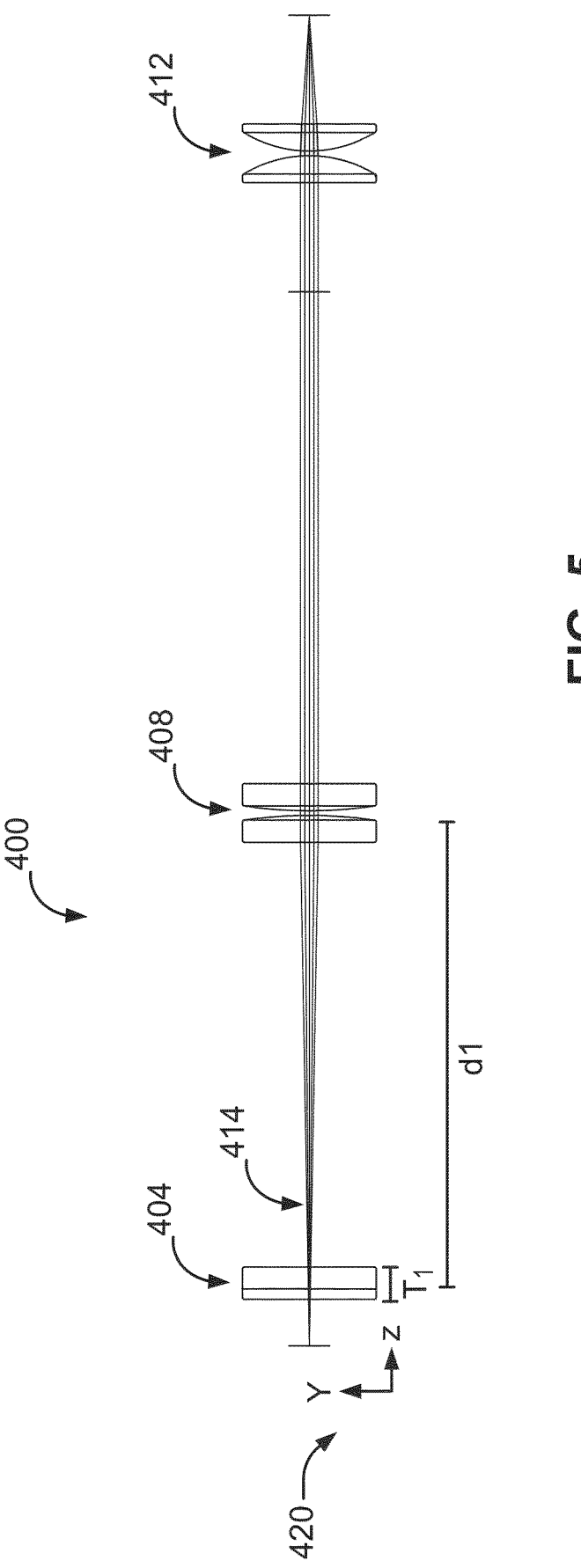
FIG. 5 illustrates a section view of the example optical relay of FIG. 4 taken along lines 5-5 of FIG. 4.

For example, FIG. 5 illustrates a cross-sectional view of the optical relay 400 taken along lines 5-5 of FIG. 4 (e.g., the X-and-Z axes of the coordinate system 420), which corresponds to the high half-angle axis. As shown in FIG. 5, the cylindrical lens 404 is substantially flat along the high half-angle axis, such that the thickness T of the lens determines the beam shape along the high half-angle axis. The cylindrical lens 404 therefore introduces a focus shift to the beam.

Figure 6:
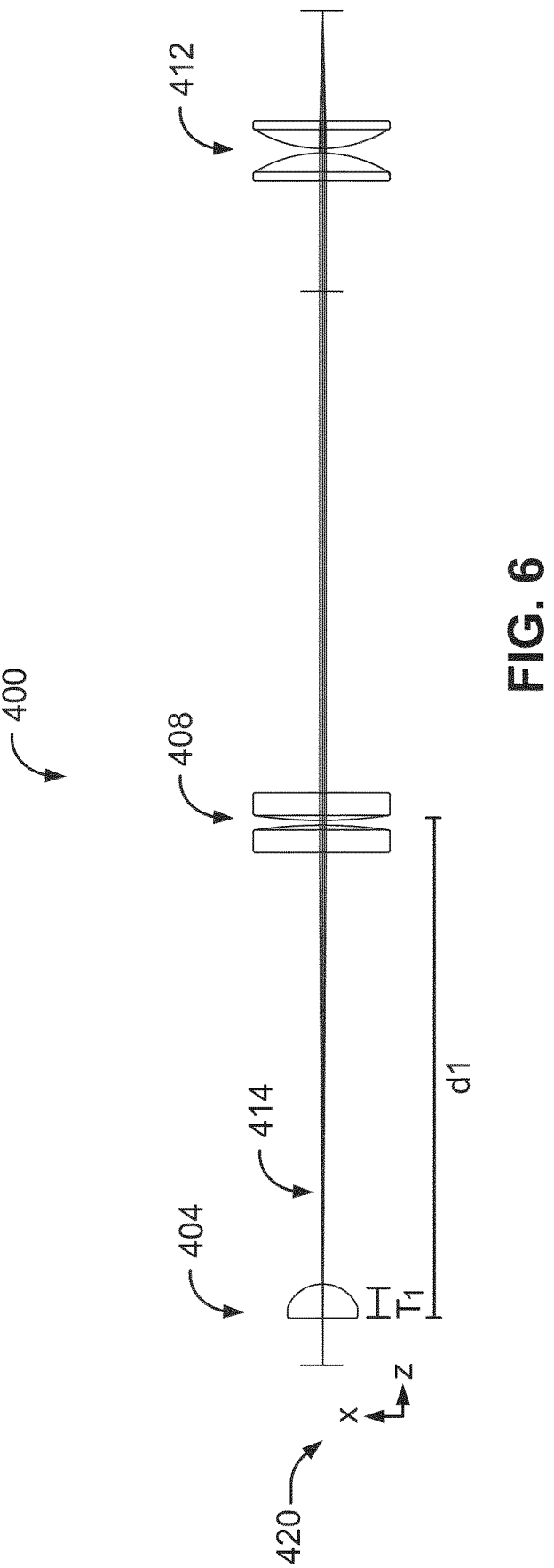
FIG. 6 illustrates a section view of the example optical relay of FIG. 4 taken along lines 6-6 of FIG. 4.

FIG. 6 illustrates a cross-sectional view of the optical relay 400 taken along the Y-Z axes, which corresponds to the low half-angle axis. As shown in FIG. 6, the cylindrical lens 404 is curved, such that the radius of curvature $r_{c1}$ (e.g., focal length) and the radius of curvature of the doublet lens 408 determines the beam shape along the low half-angle axis. In an example aspect of the configuration of FIGS. 4-6, the radius of curvature $r_{c1}$ can be approximately 7 mm. Such a configuration yields a shaped beam 414 having an aspect ratio of 6:1. The cylindrical lens 404 is positioned a distance d1 from the first lens pair 408. The distance d1 is configured to focus the shaped beam 414 on the low half-angle axis.

Figure 7:
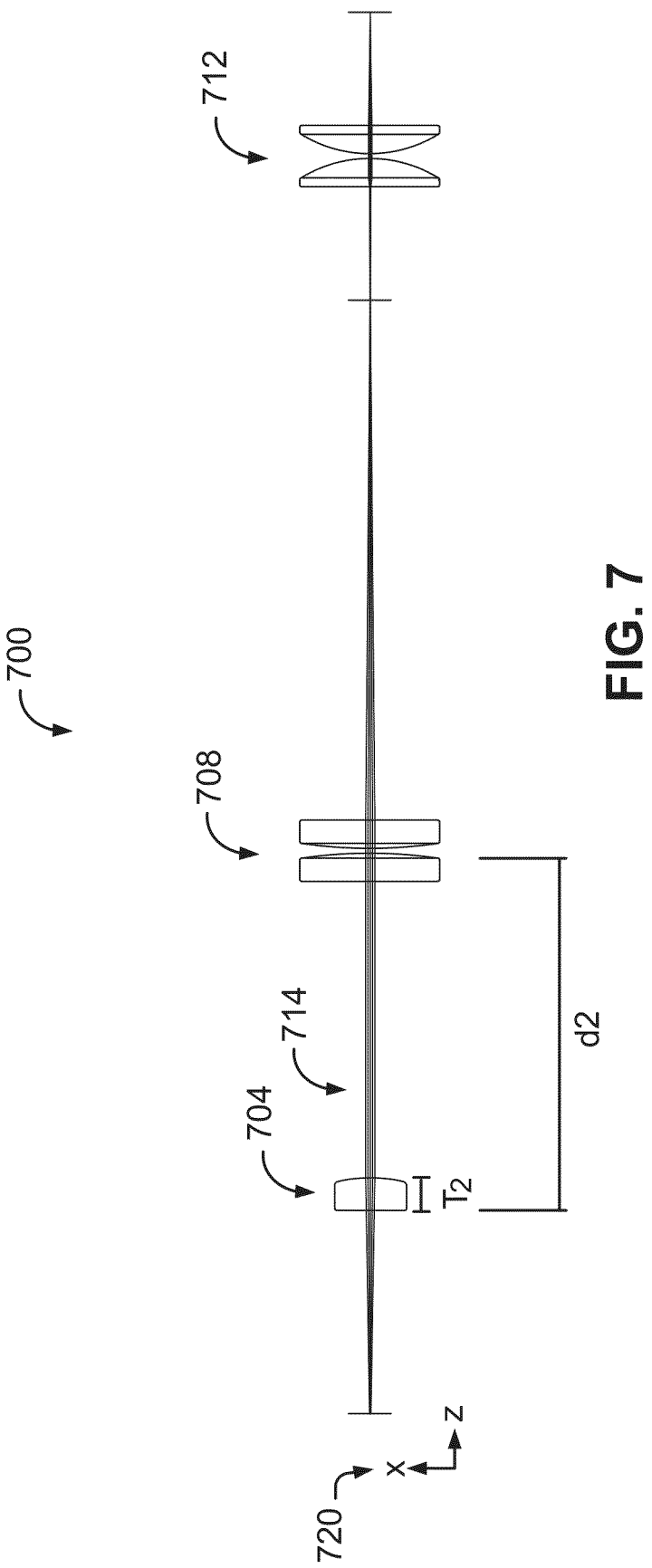
FIG. 7 illustrates a section view of an example optical relay including a cylindrical lens in accordance with aspects of this disclosure.

FIG. 7 illustrates a cross-sectional view of a low half-angle axis of an optical relay 700 that is substantially similar to the optical relay 400. Like numbers are used to indicate like parts between the optical relay 700 and the optical relay 400. As shown in FIG. 7, the cylindrical lens 704 is curved, such that the radius of curvature $r_{c2}$ (e.g., focal length) and the radius of curvature of the doublet lens 708 determine the beam shape along the low half-angle axis. The radius of curvature $r_{c2}$ of the cylindrical lens 704 is approximately 21 mm. Such a configuration yields a shaped beam 714 having an aspect ratio of 19:1. The cylindrical lens 704 is positioned a distance d2 from the first lens pair 708. The distance d2 is smaller than the distance d1 because the cylindrical lens 704 has a larger radius of curvature than the cylindrical lens 404 and the lens doublet 708 has a larger radius of curvature than the doublet lens 408.

The thickness T2 of the cylindrical lens 704 is substantially the same as the thickness T1 of the cylindrical lens 404. Therefore, the location of the focus of the cylindrical lens 704 is substantially the same as the location of the focus of the cylindrical lens 404.

Figure 8:
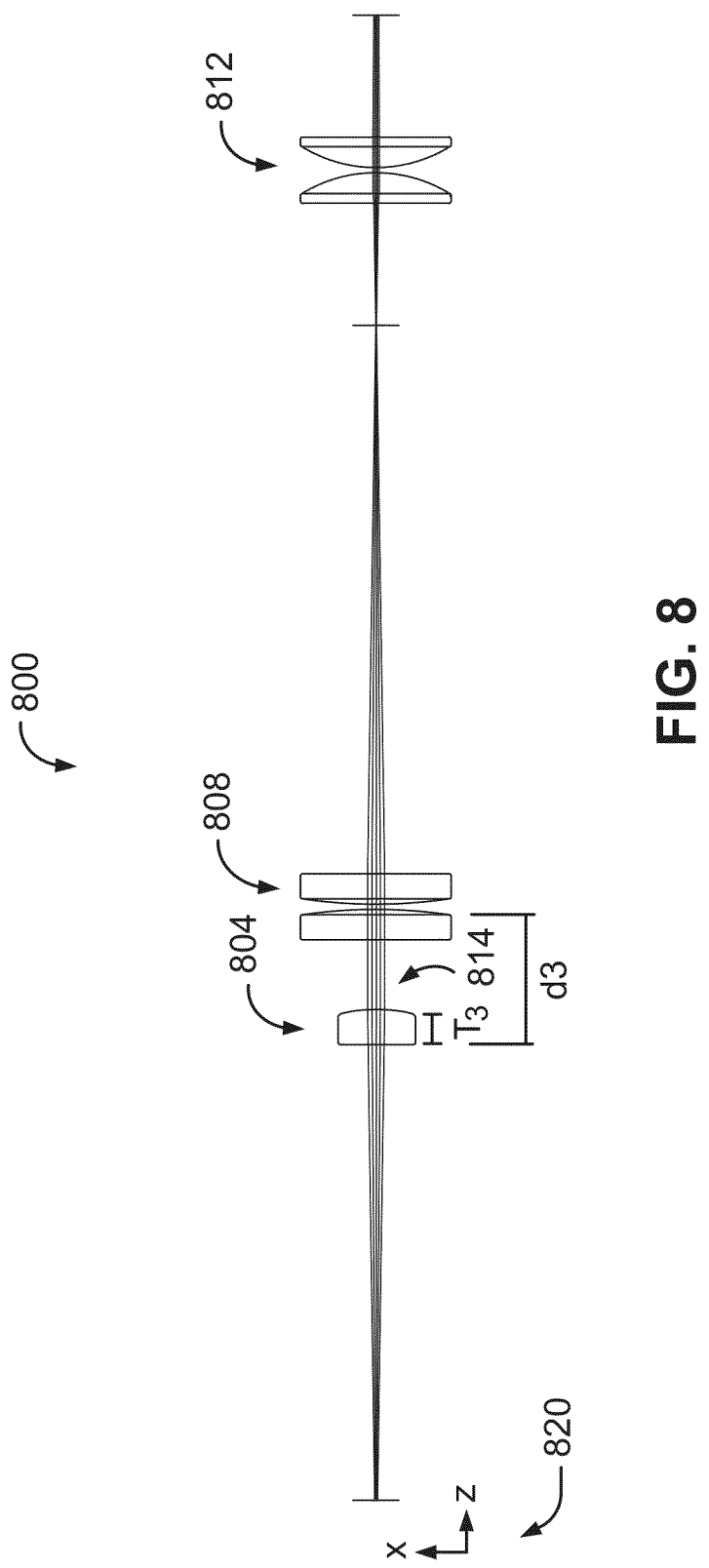
FIG. 8 illustrates a section view of an example optical relay including a cylindrical lens in accordance with aspects of this disclosure.

FIG. 8 illustrates a cross-sectional view of a low half-angle axis of an optical relay 800 that is substantially similar to the optical relay 400. Like numbers are used to indicate like parts between the optical relay 800 and the optical relay 400. As shown in FIG. 8, the cylindrical lens 804 is curved, such that the radius of curvature $r_{c3}$ determines the beam shape along the low half-angle axis. In this example aspect, the radius of curvature $r_{c3}$ is approximately 42 mm and yields a shaped beam 814 having an aspect ratio of 38:1. The cylindrical lens 804 is positioned a distance d3 from the first lens pair 808. The distance d3 is smaller than the distance d1 because the cylindrical lens 804 has a larger radius of curvature than the cylindrical lens 404.

The thickness T3 of the cylindrical lens 804 is substantially the same as the thickness T1 of the cylindrical lens 404. Therefore, the location of the focus of the cylindrical lens 800 is substantially the same as the location of the focus of the cylindrical lens 404.

Therefore, for beam shaping systems that include single cylindrical lenses 404, 704, 804, it is possible to change the aspect ratio of a shaped laser beam in one dimension by changing the radius of curvature of the cylindrical lens and the position of the cylindrical lens 404, 704, 804 along the Z-axis without changing any other components of the system. Such beam shaping systems can be optimized for different configurations and/or geometries of ion trap 270 while only modifying one component of the optical system.

Figure 9:
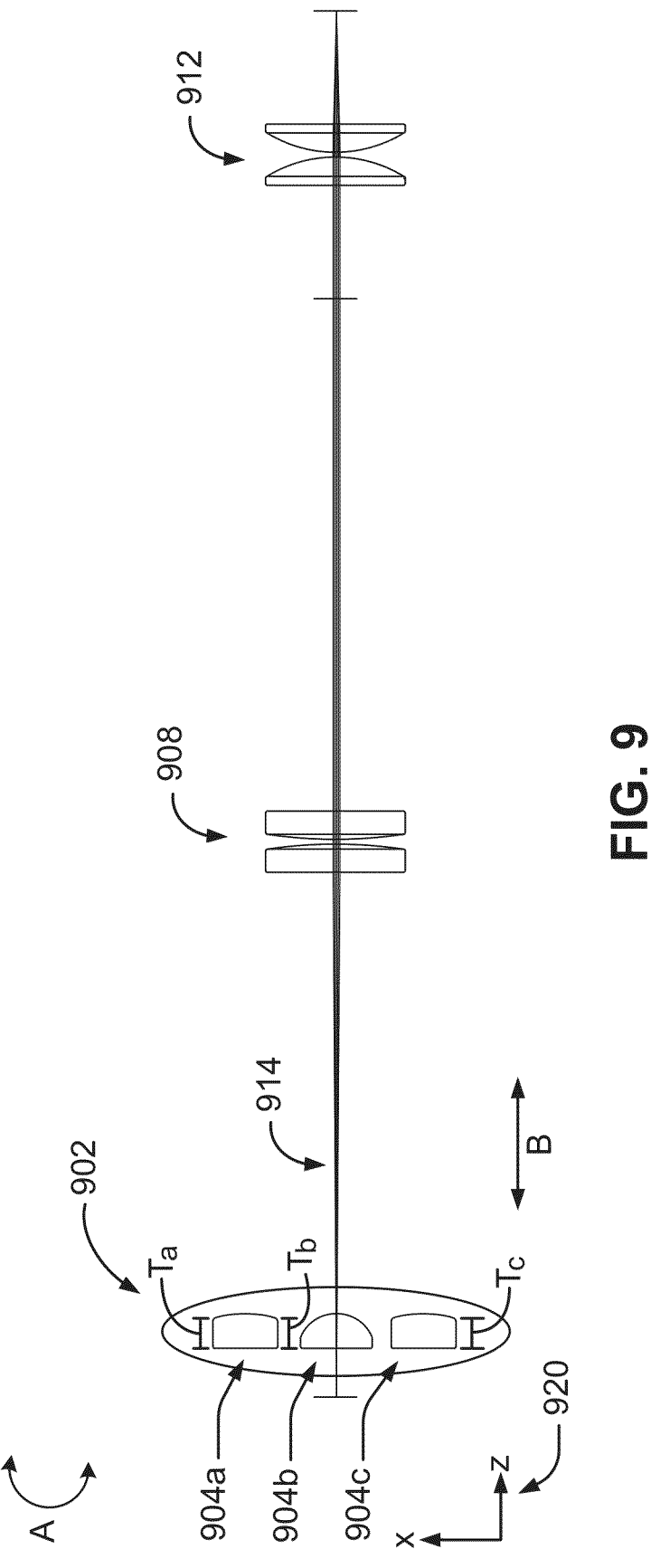
FIG. 9 illustrates a section view of an example optical relay including a plurality of cylindrical lenses in accordance with aspects of this disclosure.

For example, FIG. 9 illustrates a cross-sectional view of a low half-angle axis of an optical relay 900 that that includes a cylindrical lens mounting member 902. Like numbers are used to indicate like parts between the optical relay 700 and the optical relay 400. In the illustrated configuration, the cylindrical lens mounting member 902 is coupled to a plurality of cylindrical lenses 904. In the illustrated embodiment, the plurality of cylindrical lenses includes three cylindrical lenses 904a, 904b, 904c. In other embodiments, the plurality of cylindrical lenses 904 may include more or fewer cylindrical lenses. Each of the cylindrical lenses 904a, 904b, 904c has a different radius of curvature $rc_a$, $rc_b$, $rc_c$ along the low half-angle axis. Further, the cylindrical lens mounting member 902 can be repositioned along the Z-axis direction of FIG. 9 to change a distance between the cylindrical lens mounting member 902 and the lens doublet 908 to adjust a focus of the shaped beam 914. Therefore, the aspect ratio of the shaped beam 914 can be changed by aligning a different one of the cylindrical lenses 904a, 904b, 904c with the optical relay 900 and repositioning the cylindrical lens mounting member 902 relative to the lens doublet 908. In some aspects, the plurality of cylindrical lenses 904 may also be dimensioned to change the absolute size of the shaped beam 914.

The cylindrical lenses 904a, 904b, 904c have thicknesses Ta, Tb, Tc, respectively. In the example aspect illustrated in FIG. 9, the thicknesses Ta, Tb, Tc are substantially the same.

Therefore, the focus of the shaped beam along the fast axis does not need to be adjusted after the cylindrical lens 904a, 904b, 904c aligned with the shaped beam has been changed.

According to an example aspect, the cylindrical lens mounting member 902 can be actuable to change one or more of cylindrical lens 904a, 904b, 904c that are aligned with the optical relay 900. For example, in some aspects, the cylindrical lens mounting member 902 may be configured to rotate relative to the laser beam source 416 as indicated by the arrow A to change the cylindrical lenses 904a, 904b, 904c that is aligned with the beam produced by the laser source 912. In other aspects, the cylindrical lens mounting member 902 may be actuated in a direction orthogonal to the beam to change the cylindrical lens 904a, 904b, 904c that is aligned with the beam. The cylindrical lens mounting member 902 may be repositionable along the z-axis such that the position of the cylindrical lens 904a, 904b, 904c aligned with the beam may be adjusted relative to the first pair of lenses 908 after the cylindrical lens 904a, 904b. 904c aligned with the beam is changed to change the focus along the slow axis of the shaped beam, as indicated by the arrow B.

In addition to QIP systems, it is contemplated that the beam shaping apparatus described herein can be used to shape laser beams used in other fields, for example in a laser cutting machine.

Figure 10:
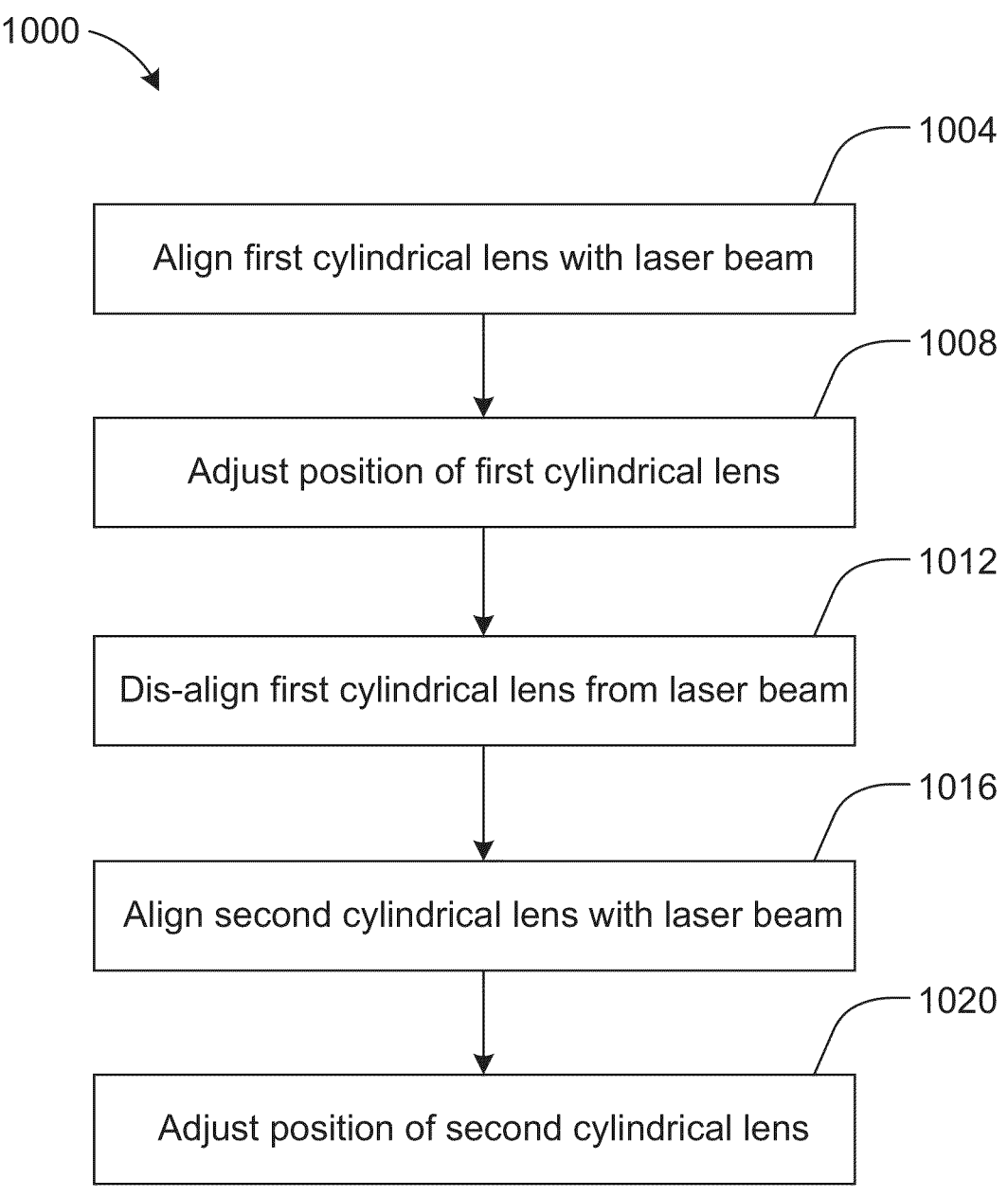
FIG. 10 illustrates an example method for changing a shape of a laser beam used to address trapped ions of a quantum information processing system in accordance with aspects of this disclosure.

FIG. 10 illustrates a flow diagram of an example method for changing a shape of laser beam used to address trapped ions of the QIP system 200. The method may be enacted by a controller of the QIP system, such as, for example, the general controller 205 and/or the optical and trap controller 220. The example method is described with regard to the optical relay 900.

At 1004, the method includes aligning a first cylindrical lens 904a with the laser beam. For example, the controller 205, 220 may command an actuator coupled to the cylindrical lens mounting member 902 to actuate the cylindrical lens mounting member 902 to align the first cylindrical lens 904a with the laser beam. The first cylindrical lens 904a has the first radius of curvature $rc_a$ and is configured to produce a first shaped beam having a first ratio of the fast axis to the slow axis.

At 1008, the position of the cylindrical lens mounting member 902 is adjusted along the direction indicated by the Z-axis (FIG. 9) to focus the first shaped beam.

At 1012, the first cylindrical lens 904a is dis-aligned from the laser beam.

At 1016, the second cylindrical lens 904b is aligned with the laser beam. For example, the controller 205, 220 may command an actuator coupled to the cylindrical lens mounting member 902 to actuate the cylindrical lens mounting member 902 to align the second cylindrical lens 904b with the laser beam. The second cylindrical lens has the second radius of curvature $rc_b$, which is different than the first radius of curvature $rc_a$. The second radius of curvature $rc_b$ is configured to produce a second shaped beam having a second ratio of the fast axis to the slow axis. The second ratio is different than the first ratio.

At 1020, the position of the cylindrical lens mounting member 902 is adjusted along the direction indicated by the Z-axis (FIG. 9) to focus the second shaped beam.

Since the cylindrical lenses 904a, 904b, 904c have the same thicknesses, it is not necessary to adjust the focus for the fast axis when transitioning between the cylindrical lenses 904a, 904b, 904c.

The third cylindrical lens 904c may be aligned with the laser beam similar to what is described with respect to the first and second cylindrical lenses 904a, 904b.

In some aspects, at least two of the cylindrical lenses 904a, 904b, 904c could have the same radius of curvature but different thicknesses. In such configurations, the focus along the slow and fast axis can simultaneously be shifted.

In order to produce beams having different slow axis beam waists and in which the Gaussian beam waist is located in the ion plane, the lenses 904a, 904b, and 904c should have different radius of curvature $rc_a$, $rc_b$, $rc_c$ and sit in different planes.

The previous description of the disclosure is provided to enable a person skilled in the art to make or use the disclosure. Various modifications to the disclosure will be readily apparent to those skilled in the art, and the common principles defined herein may be applied to other variations without departing from the scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A quantum information processing (QIP) system including:
    a laser source configured to produce a laser beam, wherein the laser beam is a Gaussian laser beam;
    a cylindrical lens aligned with at least a portion of the laser beam and configured to shape the laser beam into a shaped beam having an anamorphic shape; and
    an ion trap including a plurality of trapped ions addressable by the shaped beam,
    wherein the cylindrical lens is configured to orient the shaped beam relative to the ion trap such that a fast axis of the shaped beam is aligned with an axis of the plurality of trapped ions, and a slow axis of the shaped beam is traverse to the plurality of trapped ions.

2. The QIP system of claim 1, wherein a ratio of the slow axis to the fast axis is at least 5:1.

3. The QIP system of claim 1, wherein the cylindrical lens is a first cylindrical lens and the shaped beam is a first shaped beam, and wherein:
    the first cylindrical lens is removable from the QIP system such that the first cylindrical lens configured to be replaced by the second cylindrical lens; and
    the second cylindrical lens is configured to produce a second shaped beam such that a ratio of the fast axis to the slow axis of the second shaped beam is at least 5:1 and is different than the ratio of the fast axis to the slow axis of the first shaped beam.

4. The QIP system of claim 3, wherein a radius of curvature of the first cylindrical lens along the slow axis is different than a radius of curvature of the second cylindrical lens along the slow axis.

5. The QIP system of claim 3, wherein the first cylindrical lens has a first thickness and the second cylindrical lens has a second thickness, and wherein the first thickness is the same as the second thickness.

6. The QIP system of claim 3, wherein a half-angle along the fast axis of the first shaped beam is the same as a half-angle along the fast axis of the second shaped beam.

7. The QIP system of claim 1, wherein the cylindrical lens is not paired with another cylindrical lens.

8. The QIP system of claim 1, wherein the cylindrical lens is a first cylindrical lens, and wherein the QIP system further includes a cylindrical lens mounting bracket including at least the first cylindrical lens having a first radius of curvature in the direction of the slow axis and a second cylindrical lens, the second cylindrical lens having a second radius of curvature in the direction of the slow axis, the second radius of curvature being different than the second radius of curvature, and wherein the cylindrical lens mounting bracket is actuable relative to the laser beam such that either the first cylindrical lens or the second cylindrical lens can be aligned with the laser beam.

9. The QIP system of claim 8, wherein the cylindrical lens mounting bracket is actuable to adjust a focus of the shaped laser beam.

10. The QIP system of claim 1, wherein the shaped laser beam has a first half-angle along the fast axis and a second half-angle along the slow axis, and wherein the first half-angle is greater than the second half-angle.

11. A method for changing a shape of a laser beam used to address trapped ions of a quantum information processing (QIP) system, the method comprising:

aligning a first cylindrical lens with the laser beam, the first cylindrical lens having a first radius of curvature and configured to produce a first shaped beam having a first ratio of the fast axis to the slow axis;

dis-aligning the first cylindrical lens with the laser beam; and aligning a second cylindrical lens with the laser beam, the second cylindrical lens having a second radius of curvature different than the first radius of curvature and configured to produce a second shaped beam having a second ratio of the fast axis to the slow axis, wherein the second ratio is different than the first ratio.

12. The method of claim 11, wherein the first cylindrical lens has a first thickness and the second cylindrical lens has a second thickness, and wherein the first thickness is the same as the second thickness.

13. The method of claim 11, wherein a half-angle along the fast axis of the first shaped beam is the same as a half-angle along the fast axis of the second shaped beam.

14. The method claim 11, wherein each of the first cylindrical lens and the second cylindrical lens is not paired with another cylindrical lens.

15. The method of claim 11, wherein the first cylindrical lens and the second cylindrical lens are coupled to a mounting bracket that is actuable to adjust a focus of the shaped laser beam.

16. The method of claim 11, wherein the shaped laser beam has a first half-angle along the fast axis and a second half-angle along the slow axis, and wherein the first half-angle is greater than the second half-angle.

17. The method of claim 11, wherein the first ratio of the slow axis to the fast axis is at least 5:1.

18. A quantum information processing (QIP) system including:

a laser source configured to produce a Gaussian laser beam;

a cylindrical lens mounting bracket including:

a first cylindrical lens configured to shape the Gaussian laser beam into a first shaped beam oriented relative to the ion trap such that a fast axis of the first shaped beam is aligned with an axis of the plurality of trapped ions, and a slow axis of the first shaped beam is traverse to the plurality of trapped ions, the first cylindrical lens having a first radius of curvature in the direction of the slow axis;

a second cylindrical lens configured to shape the Gaussian laser beam into a second shaped beam oriented relative to the ion trap such that a fast axis of the second shaped beam is aligned with the axis of the plurality of trapped ions, and a slow axis of the second shaped beam is traverse to the plurality of trapped ions, the second cylindrical lens having a second radius of curvature in the direction of the slow axis, and the second radius of curvature being different than the first radius of curvature; and an ion trap including a plurality of trapped ions addressable by the shaped beam; and wherein the cylindrical lens mounting bracket is actuable relative to the Gaussian laser beam such that either the first cylindrical lens or the second cylindrical lens can be aligned with the Gaussian laser beam.

19. The QIP system of claim 18, wherein the cylindrical lens mounting bracket is actuable in a direction substantially parallel to the Gaussian laser beam to adjust a focus of the first shaped beam or the second shaped beam.

20. The QIP system of claim 18, wherein the first shaped beam has a ratio of the slow axis to the fast axis that is at least 5:1; and wherein the second shaped beam has a ratio of the slow axis to the fast axis that is different than the ratio of the first shaped beam.

* * * * *